United States Patent [19]

Uys

[11] Patent Number: 4,802,643
[45] Date of Patent: Feb. 7, 1989

[54] CABLE LADDERS

[76] Inventor: Pieter Uys, 99 Park Road, Newton, Johannesburg, Transvaal, South Africa

[21] Appl. No.: 96,949

[22] Filed: Sep. 15, 1987

[30] Foreign Application Priority Data

Sep. 29, 1986 [ZA] South Africa ............. 86/7391

[51] Int. Cl.4 .................. F16L 3/22; E06C 7/08
[52] U.S. Cl. ...................... 248/49; 182/228; 403/363; 403/331
[58] Field of Search ............ 248/49, 68.1, 58; 182/194, 207, 178, 195, 201, 222, 223, 228; 403/363, 331

[56] References Cited

U.S. PATENT DOCUMENTS

| 2,588,959 | 3/1952 | Campbell | 182/207 |
| 2,981,362 | 4/1961 | Troche | 182/207 |
| 3,225,872 | 12/1965 | O'Brien | 403/363 X |
| 3,606,418 | 9/1971 | Buker et al. | 403/363 |
| 3,841,022 | 10/1974 | Thodos | 403/363 X |
| 3,915,420 | 10/1975 | Norris | 248/68.1 |
| 4,299,362 | 11/1981 | Buluschek et al. | 248/49 |
| 4,412,756 | 11/1983 | Dunwoodie et al. | 403/363 |

FOREIGN PATENT DOCUMENTS

| 2226606 | 11/1974 | France | 248/49 |
| 1151502 | 5/1969 | United Kingdom | 248/68.1 |

OTHER PUBLICATIONS

"Tehalit" Brochure.

Primary Examiner—Alvin C. Chin-Shue
Attorney, Agent, or Firm—Fred Wiviott

[57] ABSTRACT

A GRP ladder rack of which the longitudinal rails have a cross-sectional shape which is S-formed, the cross rungs of the ladder being glued and dowelled in the lower channel fo the S-form. A short length of rail can be used to splice ladders to each other end to end using pop rivets and epoxy glue.

1 Claim, 1 Drawing Sheet

CABLE LADDERS

BACKGROUND OF THE INVENTION

1. Field of the Invention

This invention relates to cable ladders so called because they are a structure resembling ladders which are used to support cables, in particular very heavy power cables such as arise with power stations and large installations.

2. Description of the Related Art

Such cable ladders although often hot dip galvanised are still prone to destructive corrosion over a period of years. This arises especially since many installations are in ducts, basements, and other areas where moisture and other sources of corrosive attack abound. This applies also in coastal environments and industrial and factory environments where corrosive chemicals are present.

Early fibre glass cable ladders which were produced were poorly engineered and were a failure.

SUMMARY OF THE INVENTION

A cable ladder in accordance with this invention comprises two rails joined together by rungs of which the cross section of the rails is S-shaped oriented with the left rail a mirror image of the right rail and the ends of the rungs entering the inwardly directed channels of the rail.

Preferably the ladder is made of non-corrosive material, for example glass reinforced plastics and may be produced by pultrusion technique.

It will be appreciated that the S-cross section on each rail provides two channels, a first opening outwardly of the ladder and a second channel opening inwardly of the ladder and it is the latter into which the ends of the rungs are fitted and joined.

The first channel facing outwardly can receive a snugly fitting channel section to splint ladders so as to join them end to end and it is convenient that this can be done without interfering with the inner surfaces of the rails which form the perimeter of the space available for supporting cables.

However, a stronger splint may be used in the form of a short length of the S-shape rails so dimensioned so as to snugly fit into the S-shape of rails to be joined. If desired the splints can be specially made having the appropriate dimensions and proportions for this purpose. However, in accordance with a preferred embodiment of the invention the S-shaped cross section of the rails has the outer dimensions of one channel part of the S-shape a snug fit inside the inner dimensions of the other channel part of the S-shape. The advantage of this approach is that a short length of such a channel may be used as a splint to make a splint joint of cable ladders using these asymmetric S-cross section shape longitudinal rails. The critical dimension asymmetry required of the S-shaped profile for this purpose is in the width dimension of each channel portion of the S-cross section so that the inner dimension of one is larger than that of the other sufficient to admit the outer dimension of the other in a short piece which is sawn off and turned around to form a splicing piece.

The outwardly directed channels can also be used to carry smaller cables in a space that is conveniently separated from the rungs and hence the main weight, magnetic effects and voltages of larger cables which the ladder will carry.

Preferably the ends of the rungs are a tight fit in the lower channel of the S-shape and are bonded and/or dowelled, riveted or bolted in position. The tight fit reinforces the connection, in particular against twisting forces to which the ladder may be subject in service, either twisting forces tending to warp the ladder or twisting forces tending to distort it from a rectangular to a parallelogram shape.

Preferably the ladder is manufactured from glass fibre reinforced plastic (GRP) according to close tolerances and material specifications. This manufacture is preferably carried out in regard to the rails by the pultrusion technique, that is where the woven glass fibre mat on the glass fibre reinforcing and extruded plastic is pulled through the extrusion die. The rungs can be made, for example, in the form of square section tubing or channels of the same material.

Thus polyester or epoxy resins would be employed and the rungs can be bonded to the rails, for example, by means of expoxy glues. The profiles can be ultra-violet stabilised and be given fire retardant additives and the properties of the product can be enhanced, for example, by incorporation of "DACRON" (trademark) surfacing tissues.

For installations in enclosed spaces in view of fire risk polymers such as polyurethane (burning to cyanide) or polyvinylchloride (burning to phosgene) would naturally be avoided.

BRIEF DESCRIPTION OF THE DRAWINGS

The invention will be more fully described by way of an example with reference to the accompanying drawings.

In the drawings:

FIG. 1 of the drawing shows a GRP cable ladder comprising two rails 1 and 2 joined together by rungs 3. The cross section of the rails comprises a somewhat squared off or rectilinear and rectangular S-cross section which forms a first, upper channel 1,1 or 2,1 facing outwardly of the ladder and a second channel 1,2 or 2,2 facing inwardly on the ladder. The rails 1 and 2 are thus orientated with their cross sections as mirror images one of the other. The second, lower channels 1,2 and 2,2 receive the ends of the rungs 3, in a tight fit and these ends are fixed in place by means of dowels 4 and epoxy glue. The rails can be joined end to end to extend the ladder by means of splints of which splint 5 is shown in position in the upper channel of the rail 2. The splints can be glued on site and pop riveted. The pop rivets will initially hold the joint and the glue, such as a two-part epoxy, will then harden to a full strength joint.

The use of this material has advantages in respect of being an electrical non conductor and, for example, di-electric strength of 40 KV can be obtained. It also is characterised by lightness as compared with steel having a specific gravity of approximately 2. A bright colour such as orange can be used and minimum standards specified for arc resistance and water absorption, etc.

The ladder can be supplied in standard lengths, rung centres, widths and other dimensions by which a desired or required carrying capacity can be provided.

For example, this preferred embodiment is made for standard support centres at 1,5 meter spacings along the length of the rack and the desired load is 100 kg per meter over an unsupported span of 3 meters of 150 kg/meter over an unsupported span of 2 m. A two-part epoxy glue is used for glueing the rungs and each profile in U.V. stablised and incorporates "DACRON" surfacing tissue. Fire retardant additives are available and the pop rivets are nickel-copper alloy. A range of standard widths and cross rung spacings is available. Arc resistance in accordance with A.S.T.M.D495 is 130 sec in longitudinal direction. Di-electric strength according to A.S.T.M.-D149 parallel to the laminated face is 40 kv. Specific gravity A.S.T.M.D792 ranges between 1,72 and 2 and water absorption per A.S.T.M.-D229 is 0,25% after 24 hour immersion.

The cross channels may either be square section tube or channel section or both as required and may also be made by pultrusion technique.

Figure 1:
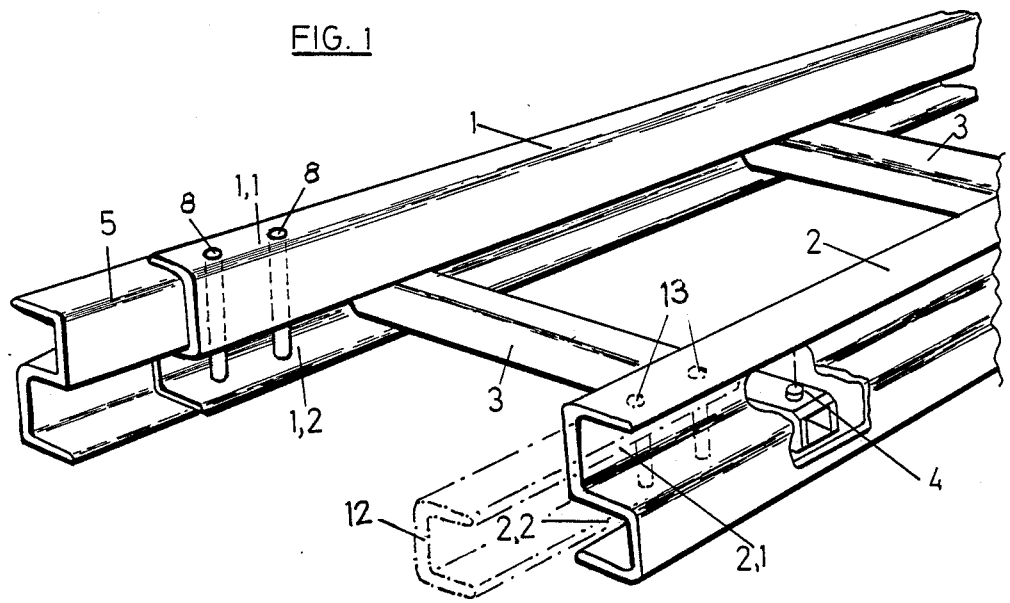
FIG. 1 is a perspective view showing portion of a cable ladder in accordance with a preferred embodiment of the invention.
Figure 2:
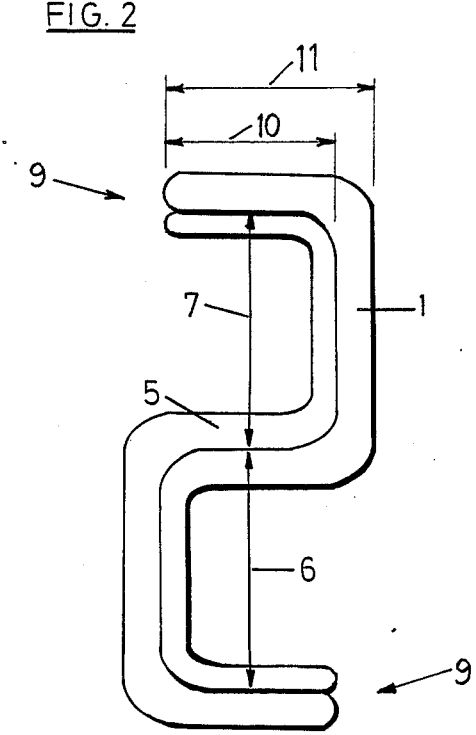
FIG. 2 is an end view of one rail of the cable ladder with a splicing piece in position.

FIG. 2 shows a longitudinal rail 1 with the splice 5 snugly fitted into the channel by being turned over. It shows that the width outer dimension 6 of one channel portion of the S-cross section of the rail 1 is a snug fit inside the width inner dimension 7 of the other channel portion of the S-cross section of the rail 1. The splice portion 5 has the same cross sectional shape and dimensions and when turned around fits snugly as shown in FIG. 2 to provide the splicing of the joint as can be seen in FIG. 1. FIG. 1 shows a splice 5 provided only in the rail 1 but the analogous splice will be provided also in the rail 2 and then a further ladder (not shown) will be added on to the end using the splices to get a strong bond using pop rivets and glue.

The simple channel section splice is strong enough for the lighter sections and for lighter duties and is then cost effective. Broken lines 12 show the outline of such a channel splice on the end of rail 2 in FIG. 1.

In addition the channel section is used for splicing of the S-shaped side rails at a change of direction in all of the ladder accessories i.e. angled bends, risers, droppers, tee pieces, four way cross overs etc. This is true for both the medium duty as well as the heavy duty cable ladder systems, because:

(a) All accessories are well supported structurally
(b) This means relatively light loadings and moment forces at side rail joints.
(c) As the angled splice forms a large portion of the cost of each accessory due to the relatively large quantity required per accessory, the most cost effective choice of splice of adequate strength is essential in order to produce a cost effective accessory. Thus the channel section is preferred to the S-shaped section for use on accessories and straight medium duty ladder lengths as it is a considerably cheaper alternative for the relatively light loads experienced at these joints.

The most cost effective method of producing any straight structural splice section (whether S-shaped, channel shaped or any other uniform shape for that matter—not tapered in length) is by pultrusion.

Small sections can be produced with dough moulding compound, but the pultrusion method will invariably produce a more cost effective solution, as long lengths can be produced cheaply and cut to size. The finish and dimensional consistency of the dough moulded product would, however, be superior to the pultruded product.

One can pultrude a solid angled section which can be cut but this method is not preferred as it produces two cut edges, one of which is fully exposed to the eye. In addition it would be difficult to ensure strength consistency which is essential in a splice.

The process of dough moulding is the only solution. One may regard this GRP process as the equivalent to injection moulding in plastics and aluminium for example. For the same reasons that the manufacture of certain products and shapes are traditionally manufactured universally by injection moulding in the plastics and aluminium industries, the angled splicer should be manufactured by the D.M.C. method, because:

(a) Structural strength is consistantly ensured.
(b) The splice is a small item and can be cost effectively produced.
(c) Dimensional consistency is ensured.
(d) The finish of the product is of a high standard.

In view of the fact that the angled splice would be used at angular joints in the fabriction of both medium and heavy duty accessories, the internal dimension of the top channel of the medium duty S-shaped side rail is best retained as equal to the internal dimension of the top channel of the heavy duty S-shaped side rail. This eliminates the duplication of die costs for two separate system products.

As the die costs are a relatively expensive cost factor in the production of D.M.C. products and as both die costs and unit production costs vary in relation to the size and volume of the product, the choice of the smallest and structurally most cost effective section is essential.

For this reason the choice of structural section was a channel section (and not a solid square or rectangular section). Thickness was chosen equal to the thickness of the top channel of our heavy duty S-shaped side rail. The channel leg dimension was chosen to ensure that the tip of the bottom leg is flush with the bottom vertical portion of the S-shaped side rail when the splice is fitted snugly in the said side rail. The nominal length of the horizontally and vertically angled splices were chosen as 150 mm as this length was found to be the shortest length possible for both mechanical and adhesive fixing of the splice to the two side rails at the respective angular joint.

In addition, a lengthening of the splice beyond 150 mm was found to be impractical, as positioning of the cross rungs on both internal and external radii of accessories (elbows, tees, etc.) could not be accomplished due to the restricted segmented arc length left between ends of splices at angular joints.

The preferred mechanical method of fixing the splint is by means of fibre glass dowels 8 for splint 5 or 13 for splint 12 as shown in FIG. 1 of the drawings which are glued and forced into holes drilled vertically through the side rail and splint whilst clamped firmly in position. The splint is glued prior to clamping in its final position and prior to drilling.

It is envisaged that standard GRP ladders will be supplied with the two side rails of one end of the ladder prefitted with splints dowelled and bonded in position to receive the unsplinted end of the next ladder on site. All that is then required of the installer is for him to glue the ends of the pair of splints to be fitted, to clamp them in position whilst he drills the vertical holes (through pilot holes drilled through the top flange of the unsplinted side rails on assembly line), glue and fit dowels in position. At this point the clamp may even be removed, as the dowels prevent any movement whatsoever.

This method eliminates the time delays experienced in site installation, caused by joints having to remain clamped until the glue has set before proceeding with the next operation.

To applicant's knowledge this method of fixing the splint by vertical dowelling cannot be used in the assembly of present GRP ladders available on the local market. Because of the shape of the side rail and splint, the dowel is only exposed over a short length in both the upper and lower channel. In addition, cables resting on the cross rungs cannot touch the dowels as they only appear in the cross rung channel on the cable side of the cross rung. The local ladders generally utilize an angle or channel section as a side rail. In the case of the channel (which is the better structural section for a side rail) the dowel is exposed to damage by cables or installers over the entire internal height of the channel (minus the cross rung height, of course).

FIG. 2 shows that the "S" cross sectional shape is so designed that the splice fits into the rail with the ends 9 flush - this is achieved by the length 10 of the free end of the channel part of the "S" shape of smaller width dimension 6 being shorter than the length 11 of the free end of the channel part of the "S" shape of larger width dimension 7.

I claim:

1. A cable ladder which comprises two rails joined together by rungs, of which the rails are of glass fibre reinforced resin the result of a pultrusion process, the cross section of the rails is S-shaped oriented with the left rail a mirror image of the right rail, the upper part of each S-shape presenting an outwardly directed channel portion and the lower part an inwardly directed channel portion, and the channel presenting extended flanges about as long as the webs, the section thickness being between 10 and 15% of the width of each channel, the ends of the rungs entering the inwardly directed channel portions of each rail clamped in a tight fit between the extended flanges, the rungs being of box section, a vertical glass fibre dowel pasing through each end of the rungs and the inwardly directed channel portion with glue bonding between rung end and channel portion, the following has said cable ladder spliced to another similar cable ladder by a splint comprising a short length of rail having the same S-cross section as the ladder rails, the width of one channel being smaller than the width of the other larger channel by the sum of the section thickness of the flanges of the larger channel and the splint being turned around to snugly fit in the ladder rails, with fastening dowels passing vertically through the ladder rails from a top flange surface through the splint and to a bottom flange surface thus stiffening the section and glue bonding the splint, the dowels, and ladder rails, the dowels thus shielded from the space between the rails above the cross rungs on which cables can be carried.

* * * * *